(12) United States Patent
Huang et al.

(10) Patent No.: US 10,379,677 B2
(45) Date of Patent: *Aug. 13, 2019

(54) OPTICAL TOUCH DEVICE AND OPERATION METHOD THEREOF

(71) Applicant: PixArt Imaging Inc., Hsinchu (TW)

(72) Inventors: Yu-Hao Huang, Hsinchu (TW); Ming-Tsan Kao, Hsinchu (TW); En-Feng Hsu, Hsinchu (TW); Yi-Yuan Chen, Hsinchu (TW); Meng-Huan Hsieh, Hsinchu (TW)

(73) Assignee: PixArt Imaging Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,264

(22) Filed: Jan. 24, 2018

(65) Prior Publication Data

US 2018/0150185 A1 May 31, 2018

Related U.S. Application Data

(63) Continuation of application No. 13/931,994, filed on Jun. 30, 2013, now abandoned.

(30) Foreign Application Priority Data

Dec. 7, 2012 (TW) .............................. 101146106 A

(51) Int. Cl.
*G06F 3/042* (2006.01)
*G06F 3/01* (2006.01)
(Continued)

(52) U.S. Cl.
CPC ............ *G06F 3/0421* (2013.01); *G06F 3/011* (2013.01); *G06F 3/017* (2013.01); *G06F 3/0304* (2013.01);
(Continued)

(58) Field of Classification Search
CPC ...................................................... G06F 3/017
See application file for complete search history.

(56) References Cited

U.S. PATENT DOCUMENTS 8,081,822 B1 * 12/2011 Bell ........................ G06F 3/017
345/157
9,116,666 B2 * 8/2015 Salter ...................... G06F 1/163
(Continued)

FOREIGN PATENT DOCUMENTS

CN 1493053 A 4/2004
CN 1932726 A 3/2007
(Continued)

OTHER PUBLICATIONS

Bergh et al, "Combining RGB and ToF cameras for real-time 3D hand gesture interaction," 2011, IEEE, 2011 IEEE Workshop on Applications of Computer Vision (WACV), pp. 1-7 (Year: 2011).*

*Primary Examiner* — Amr A Awad
*Assistant Examiner* — Maheen I Javed

(57) ABSTRACT

An operation method of an optical touch device includes: emitting, by a light emitting unit, a light beam to illuminate an object; capturing, by an image sensing device, an image of the object reflecting the light beam; selecting all pixels in the image having a brightness greater than or equal to a brightness threshold; sorting the selected pixels along a first coordinate axis of the image, a second coordinate axis of the image or based a pixel brightness; selecting the top first predetermined ratio of pixels from the sorted pixels as an object image of the object; and calculating a gravity center of the object image according to positions of the top first predetermined ratio of pixels or according to the positions of the top first predetermined ratio of pixels with a weight of pixel brightness. An optical touch device is also provided.

20 Claims, 4 Drawing Sheets

(51) Int. Cl.
   *G06F 9/00*     (2006.01)
   *G06F 3/03*     (2006.01)
   *G06F 3/041*    (2006.01)
   *G06K 9/00*     (2006.01)

(52) U.S. Cl.
   CPC ....... *G06F 3/0416* (2013.01); *G06K 9/00375* (2013.01)

(56) References Cited

U.S. PATENT DOCUMENTS

| | | |
|---|---|---|
| 2004/0108990 A1 | 6/2004 | Lieberman et al. |
| 2010/0039378 A1* | 2/2010 | Yabe ............... G06F 3/017 345/156 |
| 2010/0103191 A1 | 4/2010 | Chen et al. |
| 2011/0057875 A1 | 3/2011 | Shigeta et al. |
| 2011/0175849 A1 | 7/2011 | Ko |
| 2011/0187679 A1 | 8/2011 | Ko |
| 2011/0298710 A1* | 12/2011 | Ruckhaeberle ....... G06F 3/0317 345/158 |
| 2012/0062457 A1 | 3/2012 | Lee et al. |
| 2012/0287443 A1 | 11/2012 | Lin et al. |
| 2013/0249786 A1* | 9/2013 | Wang ............... G06F 3/011 345/156 |
| 2014/0225826 A1 | 8/2014 | Juni |

FOREIGN PATENT DOCUMENTS

| | | |
|---|---|---|
| CN | 101651804 A | 2/2010 |
| CN | 102314258 A | 1/2012 |
| EP | 2392991 A1 | 12/2011 |
| TW | 201126397 A1 | 8/2011 |
| TW | I375163 B | 10/2012 |
| TW | 201245656 A | 11/2012 |

\* cited by examiner

OPTICAL TOUCH DEVICE AND OPERATION METHOD THEREOF

TECHNICAL FIELD

The present invention relates to an optical touch technology, and more particularly to an optical touch device and an operation method thereof.

BACKGROUND

Conventionally, the optical touch device first emits, by a light emitting unit thereof, a light source to illuminate a user's hand part, capturing, by an image sensing device thereof, an image of the hand part reflecting the light source, and calculate the gravity center of the hand part image (specifically, the palm part) in the captured image. Thus, according to the gravity center calculated by the optical touch device, the rear end circuit can perform a corresponding operation, for example, controlling a movement of a cursor on a screen.

However, if the captured image includes the user's hand part as well as the user's arm part, the conventional optical touch device may calculate the gravity center based on both of the hand part as well as the arm part, which consequentially may lead to the rear end circuit have an wrong operation, such as moving the cursor to a wrong position on the screen.

SUMMARY OF EMBODIMENTS

Therefore, the present invention provides an optical touch device capable of calculating the gravity center of an object image only and thereby preventing the issues in prior art from occurring.

The present invention further provides an operation method for the aforementioned optical touch device.

An embodiment of the present invention provides an optical touch device, which includes a light emitting unit, an image sensing device and a processing circuit. The light emitting unit is configured to emit a light beam to illuminate an object. The image sensing device is configured to capture an image of the object reflecting the light beam. The processing circuit, electrically connected to the image sensing device, is configured to obtain the image, select all pixels in the image having a brightness greater than or equal to a brightness threshold, sort the selected pixels along a first coordinate axis of the image, a second coordinate axis of the image or based a pixel brightness, select the top first predetermined ratio of pixels from the sorted pixels as an object image of the object, and calculate a gravity center of the object image according to positions of the top first predetermined ratio of pixels or according to the positions of the top first predetermined ratio of pixels with a weight of pixel brightness.

Another embodiment of the present invention provides an operation method of an optical touch device. The optical touch device includes a light emitting unit and an image sensing device. The operation method includes: emitting, by the light emitting unit, a light beam to illuminate an object; capturing, by the image sensing device, an image of the object reflecting the light beam; selecting all pixels in the image having a brightness greater than or equal to a brightness threshold; sorting the selected pixels along a first coordinate axis of the image, a second coordinate axis of the image or based a pixel brightness; selecting the top first predetermined ratio of pixels from the sorted pixels as an object image of the object; and calculating a gravity center of the object image according to positions of the top first predetermined ratio of pixels or according to the positions of the top first predetermined ratio of pixels with a weight of pixel brightness.

In summary, by sequentially executing the operation steps of emitting, by a light emitting unit, a light beam to illuminate an object; capturing, by an image sensing device, an image of the object reflecting the light beam; selecting pixels in the image having a brightness greater than or equal to a brightness threshold; sorting the selected pixels along a first coordinate axis of the image, a second coordinate axis of the image, or based on the brightness of the selected pixels; selecting the first predetermined ratio of pixels from the sorted pixels as an object image of the object; and calculating the gravity center of the object image according to the positions of the first predetermined ratio of pixels or according to the positions of the first predetermined ratio of pixels with a weight of the pixel brightness; the present disclosure can determine the gravity center of a specific image more accurately and thereby preventing the issues in prior art from occurring.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
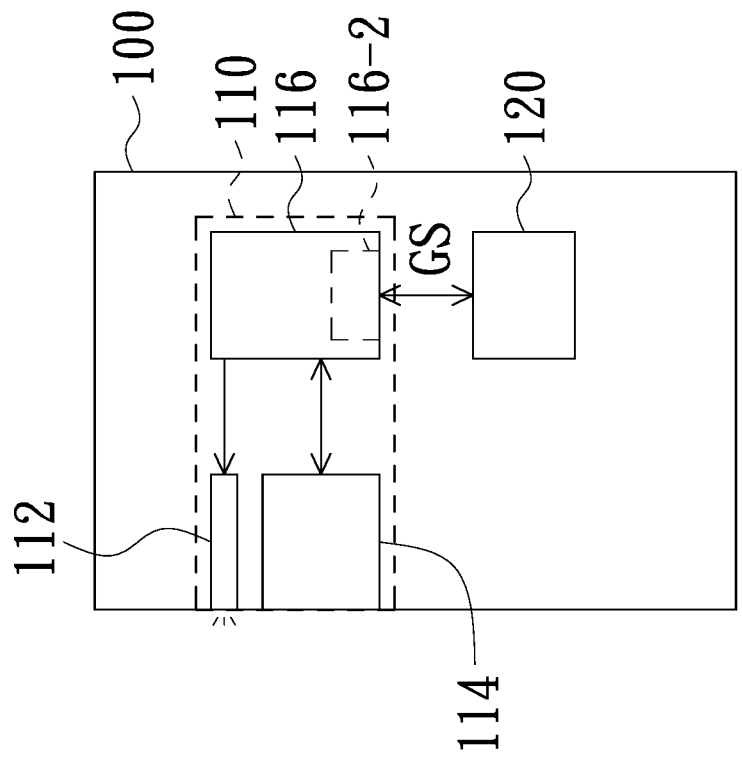
FIG. 1 is a schematic cross-sectional side view of an electronic apparatus.
Figure 1:
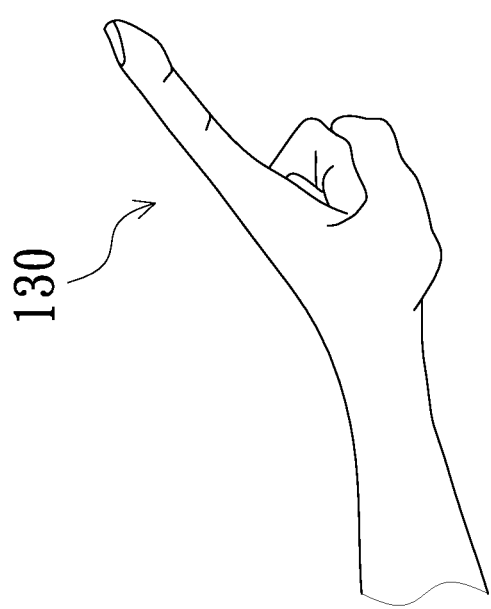

FIG. 1 is a schematic cross-sectional side view of an electronic apparatus 100, which is, for example, a portable electronic device such as a smart phone, a tablet PC, a notebook, or an electronic device with computing functions, such as a multimedia player apparatus. As shown in FIG. 1, the electronic apparatus 100 adopts an optical touch device 110 in accordance with an embodiment of the present invention. The optical touch device 110 is electrically connected to a processor 120 of the electronic apparatus 100; wherein the processor 120 is served as a rear end circuit of the optical touch device 110.

The optical touch device 110 includes a light emitting unit 112, an image sensing device 114 and a processing circuit 116. The light emitting unit 112 is configured to emit a light beam to illuminate an object 130 (for example, a user's hand). The image sensing device 114 is configured to capture an image of the hand 130 reflecting the light beam. The processing circuit 116, electrically connected to the image sensing device 114, is configured to obtain the image captured by the image sensing device 114. Furthermore, the processing circuit 116 may be further electrically connected to the light emitting unit 112 thereby being further configured to control ON/OFF of the light emitting unit 112 or even to control the brightness of the light beam emitted from the light emitting unit 112.

Figure 2:
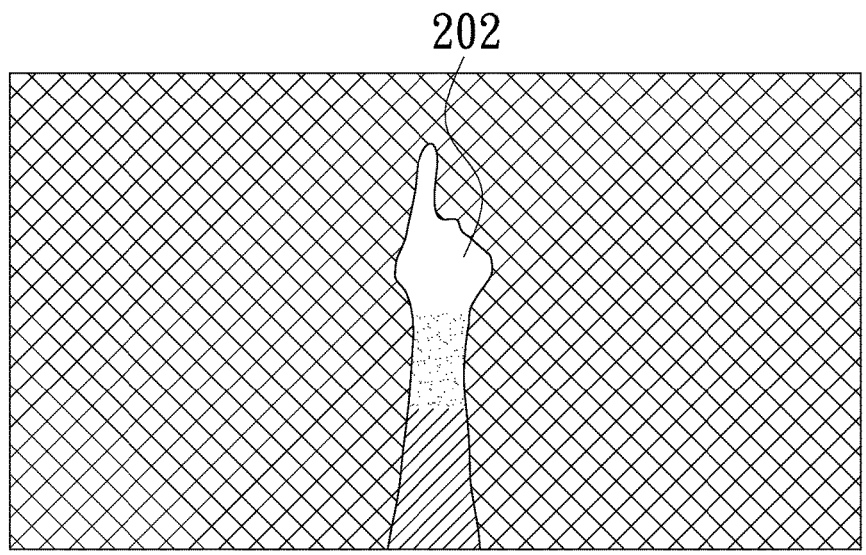
FIG. 2 is an exemplary image captured by an image sensing device arranged in an optical touch device in accordance with an embodiment of the present invention.

The function of the processing circuit 116 will be described in the following description with reference of an exemplary image shown in FIG. 2. The image illustrated in FIG. 2 is captured by the image sensing device 114 and composed by a plurality of pixels (for example, composed by 800×600 pixels). In addition, for a convenience, the image shown in FIG. 2 is presented by four areas different in brightness, which are: the brightest area (denoted by an area with no pattern therein), the sub-brightest area (denoted by an area with a dotted pattern therein), the sub-darkest area (denoted by an area with a slash pattern therein) and the darkest area (denoted by an area with a cross-hatched pattern therein). The brightest area has a first luminance; the sub-brightest area has a second luminance; the sub-darkest area has a third luminance; and the darkest area has a fourth luminance. The image shown in FIG. 2 includes a hand-and-arm image 202, which is composed by three areas different in brightness due to the three corresponding parts of the user's hand 130 physically have different distances relative to the light emitting unit 112. In addition, because that there exists no object to reflect the light beam emitted from the light emitting unit 112, the area outside the hand-and-arm image 202 has the darkest brightness.

Figure 3:
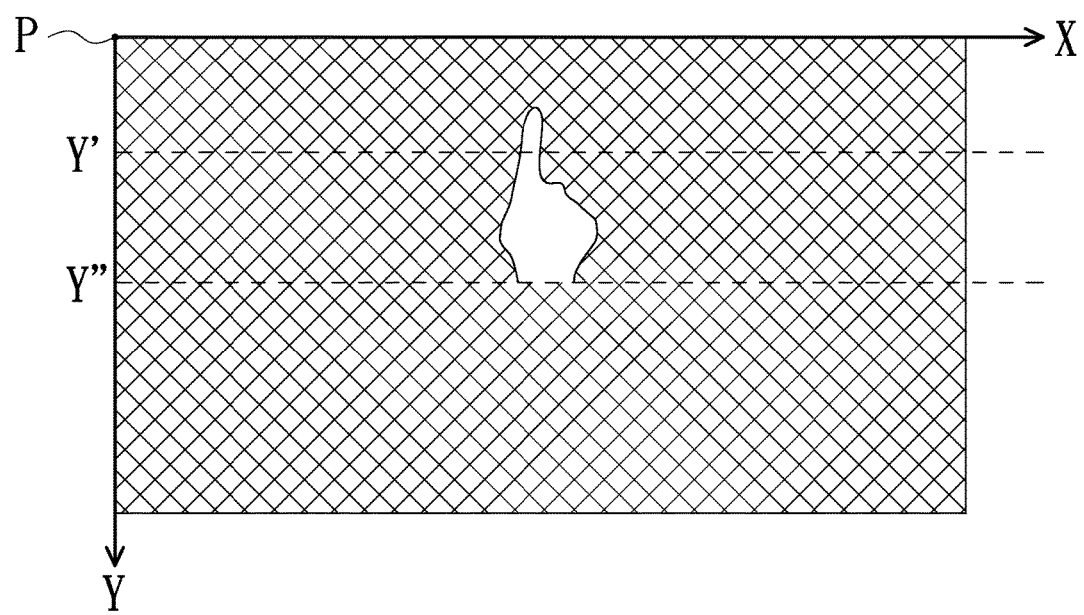
FIG. 3 is an exemplary pixels selected by one specific step performed by a processing circuit of the optical touch device.

Please refer to both FIGS. 1 and 2. The processing circuit 116, after obtaining the image shown in FIG. 2 from the image sensing device 114, is configured to select all the pixels in this obtained image having brightness greater than or equal to a brightness threshold; wherein the brightness threshold can be selected based on an actual design requirement. For example, if the brightness threshold is located between the first luminance and the second luminance, the processing circuit 116 accordingly selects all the pixels in the brightest area (denoted by the area with no pattern therein), as illustrated in FIG. 3. As shown, the image shown in FIG. 3 is displayed in a rectangular coordinate system and the position where the upper-left-most pixel located is referred to as an origin point P of the rectangular coordinate system. It is understood that the position relationship between the image and the rectangular coordinate system herein is for exemplary only, and the present invention is not limited thereto.

Figure 4:
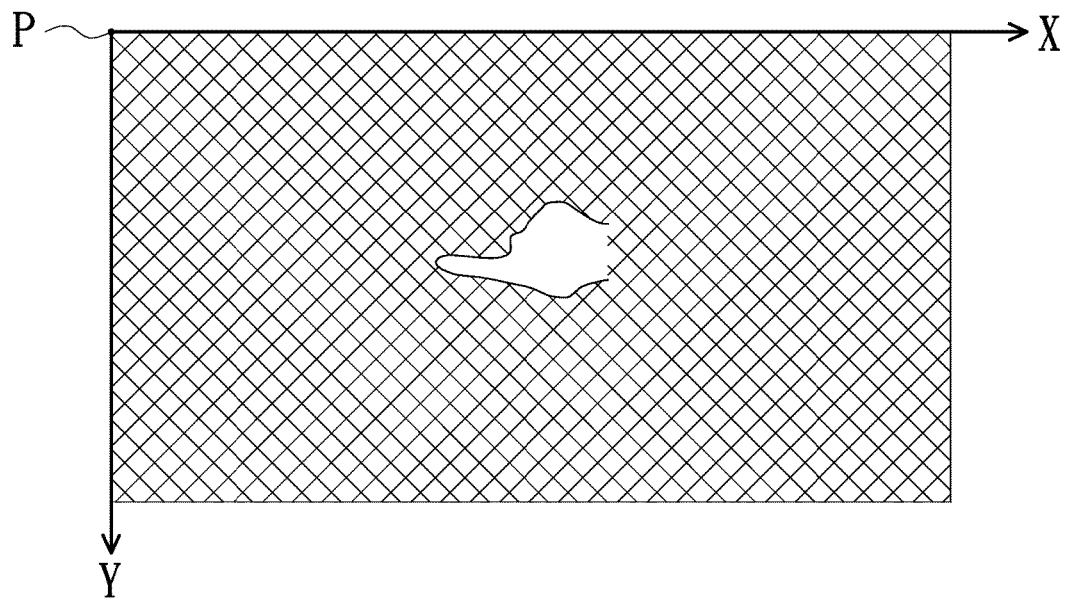
FIG. 4 is an exemplary pixels selected by one specific step performed by a processing circuit of the optical touch device.

Please refer to both FIGS. 1 and 3. The processing circuit 116, after selecting all the pixels in the brightest area (denoted by the area with no pattern therein) as illustrated in FIG. 3, is configured to sort these selected pixels; wherein the pixel sorting is performed along the X-axis, the Y-axis, or based on the brightness of the selected pixels. For example, if the pixel sorting is performed along the Y-axis, the processing circuit 116 accordingly sorts the selected pixels in top-to-bottom and left-to-right manners. It is to be noted that the sorting manner may be set depended on the imaging way of the hand part image 202. For example, for the image shown in FIG. 4, performing the pixel sorting along the X-axis (e.g., from left to right) is a proper selection; and performing the pixel sorting along the Y-axis (e.g., from top to bottom) is a proper selection, for the image shown in FIG. 3.

Please refer to FIGS. 1 and 3 again. The processing circuit 116, after performing the pixel sorting in top-to-bottom and left-to-right manners, is further configured to select the first predetermined ratio of pixels from all the sorted pixels as an object image. For example, as illustrated in FIG. 3, the sorted pixels are all located between the original point P and the line Y'' and the first predetermined ratio of sorted pixels are all located between the original point P and the line Y'. Thus, only the pixels corresponding to a finger part image, served as the object image for the follow-up operations, are selected by the processing circuit 116 and the pixels corresponding to the other parts (such as the arm part or other unrelated parts) are filtered out. The aforementioned predetermined ratio in this embodiment can be selected based on an actual design requirement. For example, the predetermined ratio can be set to 20% and accordingly the processing circuit 116 is configured to select the first 20% of pixels from all the sorted pixels. After obtaining the object image, the processing circuit 116 is further configured to calculate the gravity center of the object image based on the positions of the pixels in the object image or based on the positions of the pixels in the object image adopted with a weight of pixel brightness. In this example, the processing circuit 116 is configured to calculate the gravity center of the finger part image based on the positions of the pixels in the finger part image. As mentioned previously, the processing circuit 116 may be configured to calculate the gravity center of the finger part image based on the positions of the pixels in the finger part image with the weight of pixel brightness in another embodiment. By the aforementioned means, the calculated gravity center is an averaged gravity center. Followings are the equations for calculating the gravity center of the object image based on the positions of the pixels therein with the weight of pixel brightness:

$$X_A = \frac{(X_1 \times L_1) + (X_2 \times L_2) + \ldots + (X_N \times L_N)}{L_1 + L_2 + \ldots + L_N} \quad (1)$$

$$Y_A = \frac{(Y_1 \times L_1) + (Y_2 \times L_2) + \ldots + (Y_N \times L_N)}{L_1 + L_2 + \ldots + L_N} \quad (2)$$

wherein $X_A$ is the averaged gravity center on X-axis; $Y_A$ is the averaged gravity center on the Y-axis; $X_1 \sim X_N$ are the positions on X-axis of pixels in the object image; $Y_1 \sim Y_N$ are the positions on Y-axis of pixels in the object image; L1-LN are the pixel brightness values in the object image; and N is a natural number which represents the total number of pixels in the object image.

After calculating the gravity center of the object image, the processing circuit 116 is further configured to output corresponding gravity center information GS, which is served as a gravity center determination result; consequently, the internal processor 120 of the electronic device 100 may control the electronic device 100 to perform a corresponding operation in accordance with the gravity center information GS. For example, the processor 120 may control the movement of a cursor on a screen (not shown) of the electronic device 100 according to the gravity center information GS.

According to the above description, it is to be noted that the optical touch device 110 calculates the gravity center of the object image only rather than that of both the hand part image and the arm part image if the image captured by the image sensing device 114 includes both the user's hand part and arm part. Thus, the obtained gravity center determination result is more accurate and consequently the rear end circuit (i.e., the processor 120) of the optical touch device 110 can perform a corresponding operation (e.g., a movement of a cursor on a screen) more accurately.

Please refer to FIG. 1 again. If the electronic device 100 further includes a screen (not shown) and the screen has a resolution different with the resolution of the image captured by the image sensing device 114, accordingly the processing circuit 116 may be further configured to perform a conversion operation by determining the relative position of the cursor on the screen according to the relative position of the calculated gravity center in the image captured by the image sensing device 114. Thus, the processor 120 may control the movement of the cursor on the screen according to the result of the conversion operation from the processing circuit 116.

To make the cursor have a movement on the screen than the user's hand has, it is to be noted that the processing circuit 116 may be further configured to calculate a movement vector of the cursor based on a result of multiplying a movement vector of the calculated gravity center by a second predetermined ratio, and consequently the processor 120 can control the movement of the cursor according to the calculation result from the processing circuit 116; wherein the second predetermined ratio can be selected based on an actual design requirement. In addition, to make the cursor have a continuous movement on the screen even the user's hand stops moving, it is to be noted that the processing circuit 116 may be further configured to calculate a movement vector of the cursor based on a result of multiplying a movement vector of the position of the calculated gravity center relative to the center point of the image captured by the image sensing device 114 by a third predetermined ratio, and consequently the processor 120 can control the movement of the cursor according to the calculation result from the processing circuit 116; wherein the third predetermined ratio can be selected based on an actual design requirement. Furthermore, it is to be noted that the processing circuit 116 may further include a low-pass filter 116-2 configured to smooth the movement of the cursor on the screen.

A predetermined area is defined in the image captured by the image sensing device 114, so as to make it possible to move the cursor at an edge of the screen if the object image is located at an edge of the image captured by the image sensing device 114. In an embodiment, the predetermined area is a parallelogram and the center point of the predetermined area is located on the center point of the image captured by the image sensing device 114. The reason of failing moving the cursor at an edge of the screen and the fixing mean will be described in detail in follow.

Figure 5:
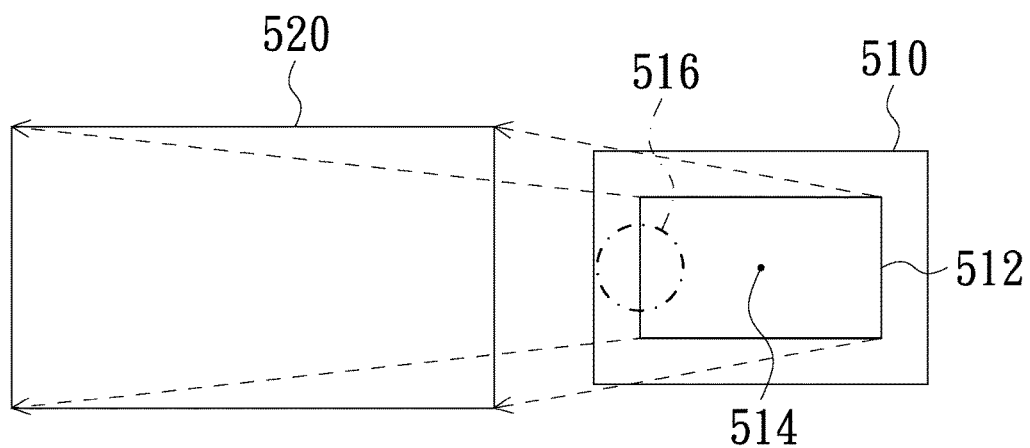
FIG. 5 is a schematic view illustrating a process of calculating a relative position of a cursor on a screen according to a relative position of a gravity center in a captured image.

Please refer to FIG. 5. As shown, when the object image 516 is located at an edge of the image 510 captured by the image sensing device 114 and the processing circuit 116, after obtaining the gravity center of the object image 516, calculates the relative position of the cursor on the screen 520 according to the relative position of the gravity center in the captured image 510, there may exist a specific distance between the cursor and the edge of the screen 520 due to the object image 516 is required to have a specific size (i.e., the object image 516 will be treated as a noise if having relatively-small size). To make the cursor be capable of being located at the edge of the screen 520, a predetermined area 512 defined in the captured image 510 is introduced. That is, the processing circuit 116, after obtaining the gravity center of the object image 516, is configured to relative position of the cursor on the screen 520 according to the relative position of the gravity center 514 in the predetermined area 512. Thus, the cursor can be located at the edge of the screen 520 if the object image 516 is located at the edge of the captured image 510.

Figure 6:
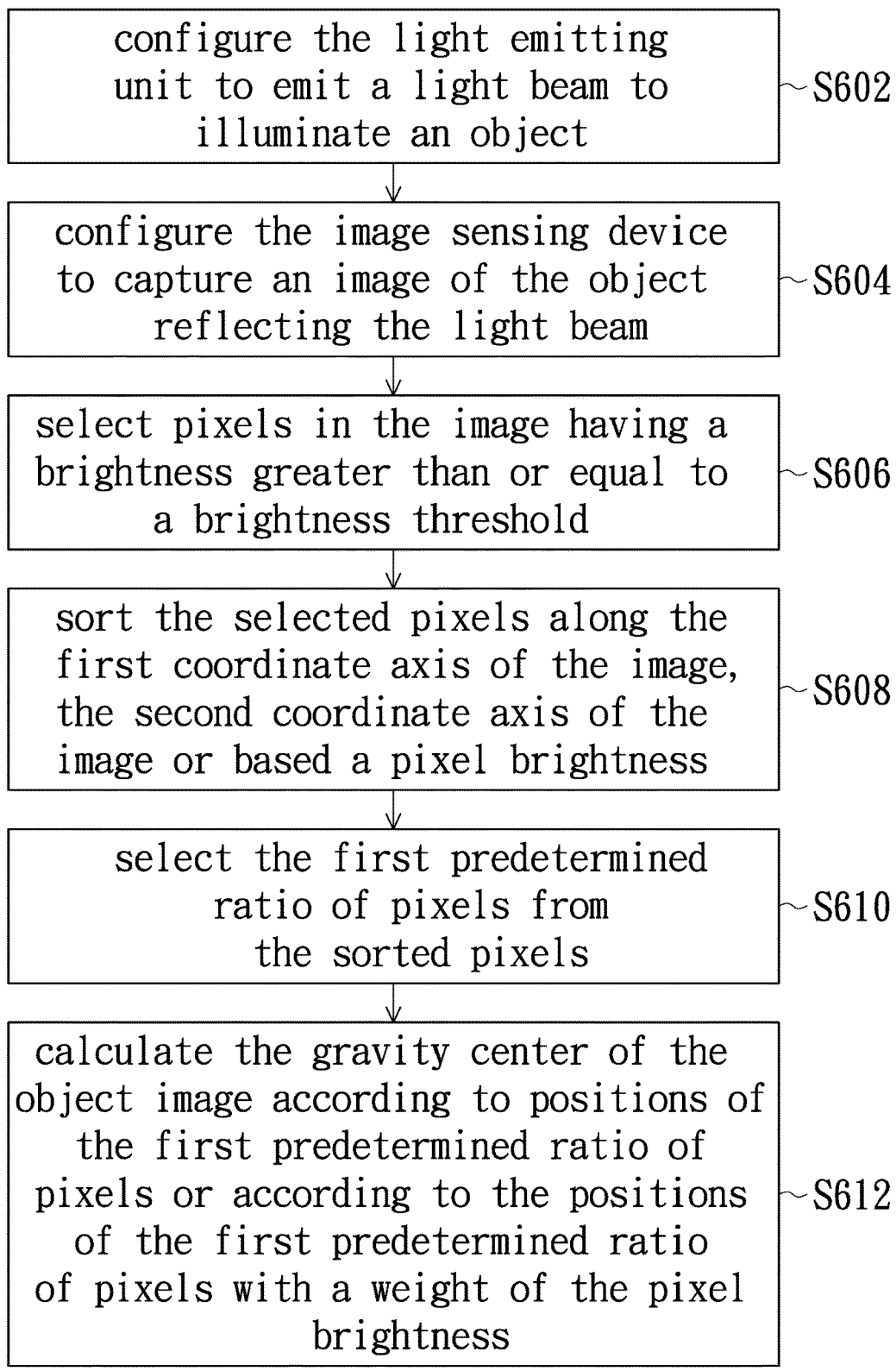
FIG. 6 is a flowchart illustrating an operation method for an optical touch device in accordance with an embodiment of the present invention.

According to the above disclosure, the optical touch device can be summarized to have some basic operation steps by those ordinarily skilled in the art. FIG. 6 is a flowchart illustrating an operation method for an optical touch device in accordance with an embodiment of the present invention. The optical touch device includes a light emitting unit and an image sensing device. The operation method in this embodiment includes steps of: emitting, by the light emitting unit, a light beam to illuminate an object (step S602); capturing, by the image sensing device, an image of the object reflecting the light beam (step S604); selecting pixels in the image having a brightness greater than or equal to a brightness threshold (step S606); sorting the selected pixels along a first coordinate axis of the image, a second coordinate axis of the image, or based on the brightness of the selected pixels (step S608); selecting the first predetermined ratio of pixels from the sorted pixels as an object image of the object (step S610); and calculating the gravity center of the object image according to the positions of the first predetermined ratio of pixels or according to the positions of the first predetermined ratio of pixels with a weight of the pixel brightness (step S612).

In summary, by sequentially executing the operation steps of emitting, by a light emitting unit, a light beam to illuminate an object; capturing, by an image sensing device, an image of the object reflecting the light beam; selecting pixels in the image having a brightness greater than or equal to a brightness threshold; sorting the selected pixels along a first coordinate axis of the image, a second coordinate axis of the image, or based on the brightness of the selected pixels; selecting the first predetermined ratio of pixels from the sorted pixels as an object image of the object; and calculating the gravity center of the object image according to the positions of the first predetermined ratio of pixels or according to the positions of the first predetermined ratio of pixels with a weight of the pixel brightness; the present disclosure can determine the gravity center of a specific image more accurately and thereby preventing the issues in prior art from occurring.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch device, comprising:
a light emitting unit configured to emit a light beam to illuminate an object;
an image sensor captures an image of the object reflecting the light beam; and
a processing circuit, electrically connected to the image sensing device, configured to obtain the image, select all pixels in the image having a brightness greater than or equal to a brightness threshold, sort the selected pixels based on the brightness of the selected pixels so as to sort the different distances of the object from the light emitting unit, select the top first predetermined ratio of the sorted pixels as an object image of the object, and calculate a gravity center of the object image, wherein the size of the object image is smaller than the size of the image of the object captured by the image sensing device.

2. The optical touch device according to claim 1, wherein the processing circuit is further configured to calculate a relative position of a cursor on a screen according to a relative position of the gravity center in the image.

3. The optical touch device according to claim 2, wherein the processing circuit comprises a low-pass filter configured to smooth a movement of the cursor on the screen.

4. The optical touch device according to claim 2, wherein the processing circuit is further configured to calculate a movement vector of the cursor based on a result of multiplying a movement vector of the gravity center by a second predetermined ratio.

5. The optical touch device according to claim 2, wherein the processing circuit is further configured to calculate a movement vector of the cursor based on a result of multiplying a position of the gravity center relative to a center point in the image by a second predetermined ratio.

6. The optical touch device according to claim 1, wherein the processing circuit is further configured to calculate a relative position of a cursor on a screen based on a relative position of the gravity center in a predetermined area in the image.

7. The optical touch device according to claim 6, wherein the predetermined area is a parallelogram, and the center point of the predetermined area is located at the center point of the image.

8. The optical touch device according to claim 6, wherein the processing circuit comprises a low-pass filter configured to smooth a movement of the cursor on the screen.

9. The optical touch device according to claim 6, wherein the processing circuit is further configured to calculate a movement vector of the cursor based on a result of multiplying a movement vector of the gravity center by a second predetermined ratio.

10. The optical touch device according to claim 6, wherein the processing circuit is further configured to calculate a movement vector of the cursor based on a result of multiplying a position of the gravity center relative to a center point in the image by a second predetermined ratio.

11. An operation method of an optical touch device, the optical touch device comprising a light emitting unit and an image sensing device, the operation method comprising:

emitting, by the light emitting unit, a light beam to illuminate an object;

capturing, by the image sensing device, an image of the object reflecting the light beam;

selecting all pixels in the image having a brightness greater than or equal to a brightness threshold;

sorting the selected pixels, wherein the sorting is performed along the first coordinate axis then the selected pixels from top-to-bottom, or the sorting is performed along the second coordinate axis then the selected pixels from left-to-right, in order to sort the different distances of the object from the light emitting unit;

selecting the top first predetermined ratio of the sorted pixels as an object image of the object; and calculating a gravity center of the object image, wherein the size of the object image is smaller than the size of the image of the object captured by the image sensing device.

12. The operation method according to claim 11, further comprising: calculating a relative position of a cursor on a screen according to a relative position of the gravity center in the image.

13. The operation method according to claim 12, further comprising: smoothing, by a low-pass filter, a movement of the cursor on the screen.

14. The operation method according to claim 12, further comprising: calculating a movement vector of the cursor based on a result of multiplying a movement vector of the gravity center by a second predetermined ratio.

15. The operation method according to claim 12, further comprising: calculating a movement vector of the cursor based on a result of multiplying a position of the gravity center relative to a center point in the image by a second predetermined ratio.

16. The operation method according to claim 11, further comprising: calculating a relative position of a cursor on a screen based on a relative position of the gravity center in a predetermined area in the image.

17. The operation method according to claim 16, wherein the predetermined area is a parallelogram, and the center point of the predetermined area is located at the center point of the image.

18. The operation method according to claim 16, further comprising: smoothing, by a low-pass filter, a movement of the cursor on the screen.

19. The operation method according to claim 16, further comprising: calculating a movement vector of the cursor based on a result of multiplying a movement vector of the gravity center by a second predetermined ratio.

20. The operation method according to claim 16, further comprising: calculating a movement vector of the cursor based on a result of multiplying a position of the gravity center relative to a center point in the image by a second predetermined ratio.

* * * * *